Figure 1:
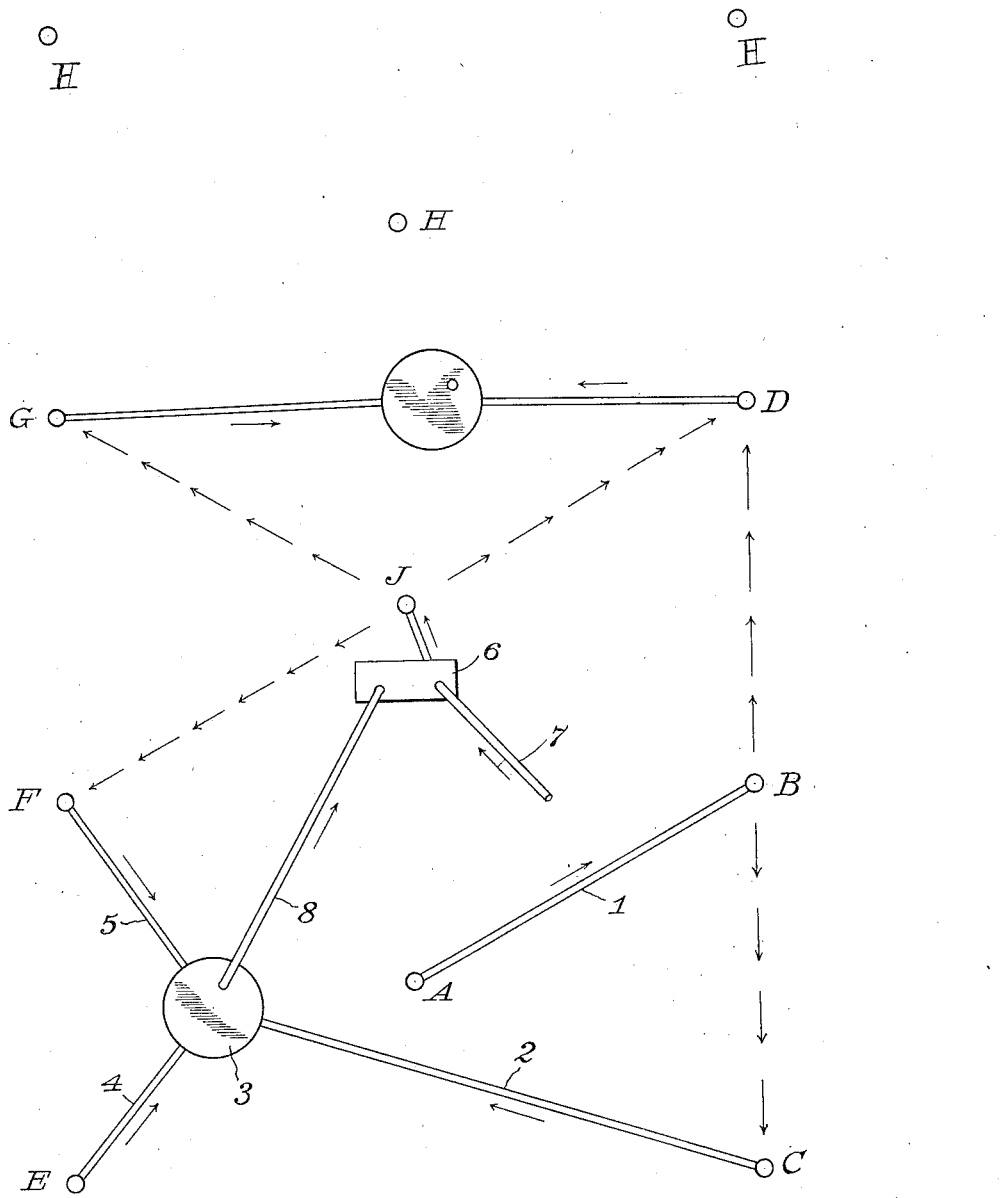

T. W. WRIGHT.
METHOD FOR CONSERVING NATURAL GAS AND OIL.
APPLICATION FILED DEC. 20, 1912.

1,101,605.

WITNESSES:
L. J. Fischer
K. Imboden

INVENTOR:
Thomas W. Wright
BY F. G. Fischer
ATTORNEY

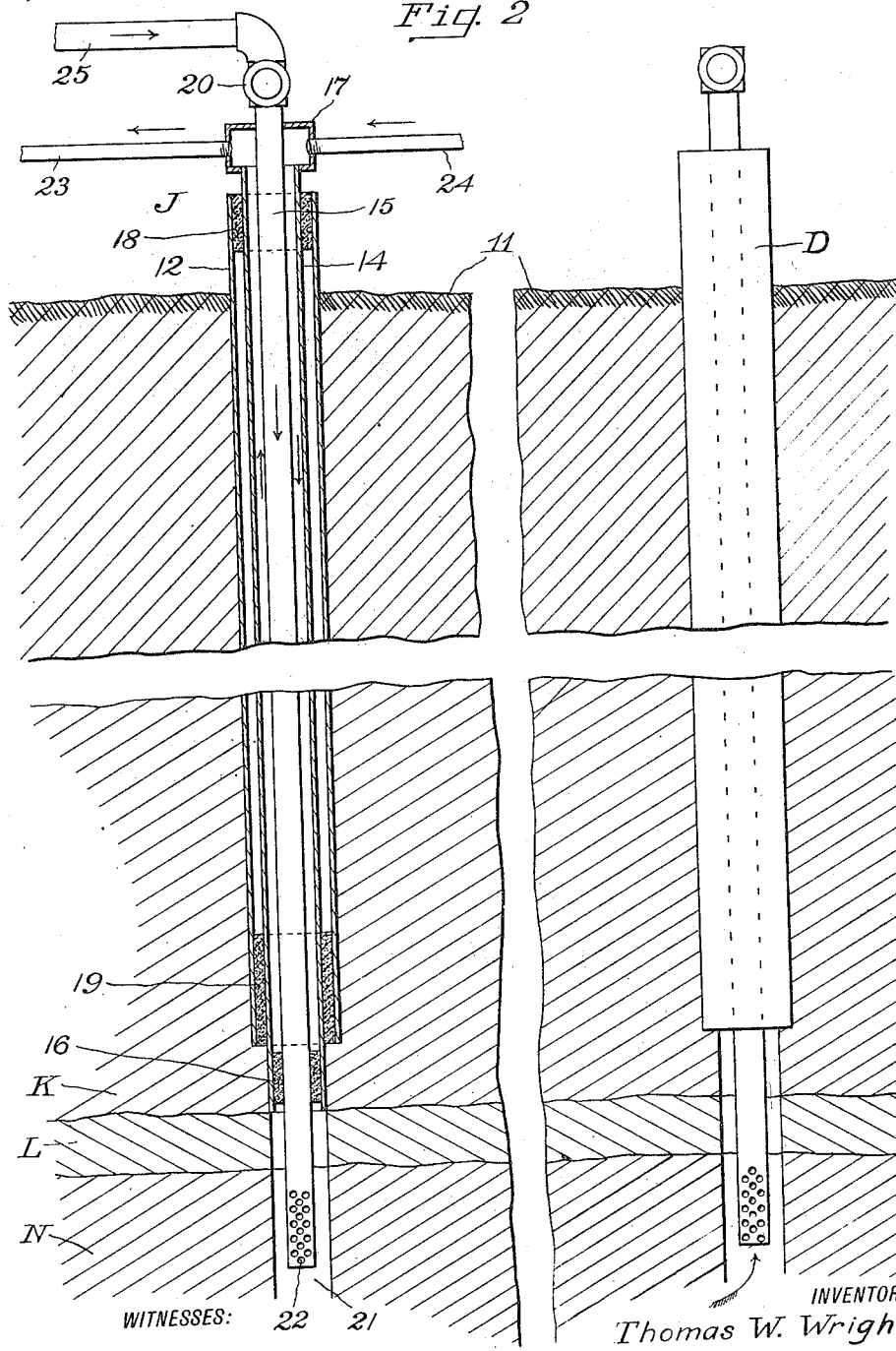

UNITED STATES PATENT OFFICE.

THOMAS W. WRIGHT, OF HENRYETTA, OKLAHOMA.

METHOD FOR CONSERVING NATURAL GAS AND OIL.

1,101,605.  Specification of Letters Patent.  Patented June 30, 1914.

Application filed December 20, 1912. Serial No. 737,871.

*To all whom it may concern:*

Be it known that I, THOMAS W. WRIGHT, a citizen of the United States, residing at Henryetta, in the county of Okmulgee and State of Oklahoma, have invented certain new and useful Improvements in Methods for Conserving Natural Gas and Oil, of which the following is a specification.

My invention relates to a method of conserving natural gas and using the gas for the extraction of petroleum from fields where the oil could not otherwise be brought to the surface except by pumping.

Millions of feet of natural gas waste into the atmosphere every day in some districts owing to lack of artificial reservoirs for same.

One object of my invention is to save this gas, and not only this, but to employ it as a medium for the extraction and enrichment of oil which is forced to the surface by the pressure thereof.

The gas which I refer to above as going to waste, rises in some wells from the oil contained in the oil-bearing rock. In other wells in the same vicinity, the gas may have ceased to issue, though the oil deposits therein may be as great as in the other instance. The pressure of the wasting gas issuing from some wells is very great. The main idea of my invention is to divert and conserve such gas by turning it into a non-gas-producing, but oil containing well, shutting in said well to prevent the escape of gas and oil therefrom; taking the gasolene-charged oil from other (now dead) wells in the same field; storing the oil in tanks having closed tops; and recovering the gas from the space above the oil in such tanks. One million feet of gas can be stored under pressure in the space of 50 to 100 barrels of petroleum. In practice, I may employ natural gas from a well at a pressure insufficient to raise oil in adjacent wells, but by means of a compressor raise the pressure to a sufficient point for that purpose.

Among other advantages which I claim are: The oil can be drained from the beds in less time than under the present system. A larger production and a cheaper method of extracting the oil. Utilizing subterranean spaces for the storage of gas.

In order that my invention may be fully understood, reference will now be made to the accompanying drawings, in which:

Figure 1 is a plan view of a group of eleven wells, showing apparatus that may be employed in the practice of my invention. Fig. 2 is a diagrammatic view in vertical section of two not far distant wells, one of which is equipped with means for practising my invention. On Fig. 1, the small circles represent wells of the usual kind.

A designates a well from which gas issues at a pressure sufficiently high for my purpose without requiring pumping or compression.

B designates a well which taps oil-bearing rock but has ceased to yield oil by natural pressure. I connect the casing of well A to an inner tube of well B by a suitable pipe 1. The gas in well B becomes liquefied by the high pressure and by cooling means (presently described), and the gasolene thus formed permeates the oil-bearing rock and drives the oil therefrom to other parts of the field, which are tapped by other wells as C, D, E, F, G, H, J. The aforesaid pressure now causes oil to rise through one or more of said wells, say through well C. From this well, I run a pipe 2 to the lower part of a closed-top steel storage tank 3, of large capacity for both oil and gas. From this reservoir, oil and gas may be taken and sold when good markets exist. Other wells, as E and F, that may yield oil under my invention, may be connected to the same reservoir 3, as by pipes 4, 5.

6 designates a shed containing a gas compressing pump. Gas from any source, may be taken to said pump by a pipe 7, and compressed for use as aforesaid in an adjacent well J. Of course the gas might be drawn from the reservoir 3, as indicated by pipe 8.

It is to be understood that none of the wells on the group shown, may yield gas for my purpose. In that case, gas may be piped from a well at any point which is not excessively distant and brought to the local oil field, the cost of piping and labor being the only limitations on such transportation. The producing well A is shown here merely for convenience of illustration.

The simplest method in which I contemplate preparing a receiving well as J, is shown in Fig. 2, in which: 11 designates the land surface: K, a cap rock stratum at the bottom of the wells J and D, which may be as much as a mile or more apart. L and N designate gas-rock and oil-rock strata which in some fields are termed "gas sand" and "oil sand," respectively. The well J has the usual casing 12, in which are two concentric inner tubes, 14 and 15. Tube 14 extends down to gas-rock L, and here there is a tight packing 16 between tubes 14 and 15. On the upper end of tube 14 is screwed a breaking-head 17. Between tube 14 and casing 12 are two packings 18 and 19, one at the top and one at the bottom of the well. The smallest tube, 15, passes through the breaking-head 17 and to a valve 20, and extends downward past the end of tube 14 into the bore 21. Its lower end may have perforations, 22. In the breaking-head 17, I bore and tap two opposite holes to receive brine pipes 23 and 24, both of which may be connected with a force pump, or one may be connected with the pump while the other discharges the brine at any suitable place. Connected to valve 20 is the pipe 25 through which gas at sufficient pressure is conveyed to the well J. Said pipe may come from a compressor, or from another well directly, as pipe 1, Fig. 1. The great pressure upon the gas in tube 15, also the increasing temperature of the earth downward, will cause the gas to become hot. To offset this and cause liquefaction, cold brine is forced in through pipe 24. Being much colder, this incoming brine will sink through the warm brine and will absorb heat from the tube 15, while warm brine will constantly escape through pipe 23. The gas liquefies in tube 15, enters the oil-rock N, thins the oil therein, and drives the oil to spots where other wells as D exists, which wells offer relief to the pressure. The mixed oil and gasolene rises in said well or wells, and is piped therefrom to a reservoir as aforesaid. In the reservoir large quantities of gas will evaporate from the oil, and are conserved by the closed top of the reservoir, which is provided with a safety-valve to announce a predetermined pressure. The gas which thus escapes, I do not allow to go to waste, but will either convey it to another tank or utilize it for extracting oil by my new process herein described.

It should be borne in mind that my method is not expensive and does not require the boring of new wells. Bores already in existence may be employed exclusively.

In the claims, I shall employ the term "oil bore" for brevity and to designate a well tapping oil deposits, that cannot by present methods be raised, except by pumping or "shooting."

The forcing of gas down oil wells is not limited under my claims to such wells as issue no gas. Any well, whether gas-producing or not, may serve as an inlet for the compressed or liquefied gas. Also, old bores that may be filled with water can be pumped out and used under my method.

Having thus described my invention what I claim and desire to secure by Letters-Patent, is:

1. A method of obtaining oil from exhausted wells which consists in forcing a liquefied natural gas substance into an oil bearing stratum at one point and receiving oil mingled with said substance at another point.

2. A method of obtaining oil, consisting in forcing quantities of natural gas into an oil bore, continuously liquefying said gas within said bore, to form a liquid natural gas substance, leading such substance into an oil bearing stratum, and recovering the oil and substance from said stratum.

3. A method of obtaining oil, consisting in forcing quantities of a natural gas substance into an oil bore and through such bore into an oil bearing stratum, continuously liquefying such gas within said bore, receiving the oil through another bore, storing said oil, and recovering therefrom the substance which may separate out.

4. A method of obtaining oil and conserving gas, consisting in charging an oil bore with natural gas substance at high pressure to force the oil from oil bearing rock at the bottom of said bore, receiving the oil from another bore, and conveying the oil to a closed reservoir provided with space for gas which may separate from the oil.

In testimony whereof I affix my signature in the presence of two witnesses.

THOMAS W. WRIGHT.

Witnesses:
K. M. IMBODEN,
L. J. FISCHER.